(12) United States Patent
Ji et al.

(10) Patent No.: US 10,924,200 B2
(45) Date of Patent: Feb. 16, 2021

(54) RECONFIGURABLE OPTICAL ADD/DROP MULTIPLEXER

(71) Applicant: HUAWEI TECHNOLOGIES CO., LTD., Shenzhen (CN)

(72) Inventors: Ruiqiang Ji, Dongguan (CN); Shengmeng Fu, Wuhan (CN); Yanbo Li, Dongguan (CN); Lewei Zhang, Wuhan (CN); Li Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/663,521

(22) Filed: Oct. 25, 2019

(65) Prior Publication Data
US 2020/0059314 A1    Feb. 20, 2020

Related U.S. Application Data

(63) Continuation of application No. PCT/CN2018/082558, filed on Apr. 10, 2018.

(30) Foreign Application Priority Data

Apr. 26, 2017 (CN) .......................... 201710285001.9

(51) Int. Cl.
*H04J 14/02* (2006.01)
*G02B 6/293* (2006.01)
(Continued)

(52) U.S. Cl.
CPC ........ *H04J 14/021* (2013.01); *G02B 6/29302* (2013.01); *G02B 6/29343* (2013.01);
(Continued)

(58) Field of Classification Search
None
See application file for complete search history.

(56) References Cited

U.S. PATENT DOCUMENTS

| 6,411,752 B1 * | 6/2002 | Little | G02B 6/12002 |
| | | | 385/17 |
| 6,580,851 B1 * | 6/2003 | Vahala | G02B 6/12007 |
| | | | 385/15 |

(Continued)

FOREIGN PATENT DOCUMENTS

| CN | 1409510 A | 4/2003 |
| CN | 1737625 A | 2/2006 |

(Continued)

OTHER PUBLICATIONS

International search report dated May 31, 2018 from corresponding application No. PCT/CN2018/082558.

(Continued)

*Primary Examiner* — Jai M Lee
(74) *Attorney, Agent, or Firm* — Hauptman Ham, LLP (57) ABSTRACT

A reconfigurable optical add/drop multiplexer includes N input ports, N output ports, M add ports and M drop ports. Each of the N input ports and each of the M add ports is respectively connected to one first polarizer. Each of the N output ports and each of the M drop ports is respectively connected to one second polarizer. A first end of the first polarizer is connected to a second end of the first polarizer, forming a loop including the first polarizer. A first end of the second polarizer is connected to a second end of the second polarizer, forming a loop including the second polarizer. An annular waveguide array is between a loop $L_{Ii}$ and a loop $L_{Oj}$. A first polarizer included in the loop $L_{Ii}$ is connected to an $i^{th}$ input port. A second polarizer included in the loop $L_{Oj}$ is connected to a $j^{th}$ output port.

10 Claims, 5 Drawing Sheets

(51) Int. Cl.
*H04B 10/50* (2013.01)
*H04B 10/60* (2013.01)

(52) U.S. Cl.
CPC ......... *G02B 6/29382* (2013.01); *H04B 10/50* (2013.01); *H04B 10/60* (2013.01); *H04J 14/0201* (2013.01)

(56) References Cited

U.S. PATENT DOCUMENTS

| | | |
|---|---|---|
| 6,912,340 B2 | 6/2005 | Bacque |
| 7,102,821 B1 | 9/2006 | Liu et al. |
| 7,218,857 B1 | 5/2007 | Li |
| 7,505,648 B2 | 3/2009 | Klein et al. |
| 8,032,027 B2 | 10/2011 | Popovic |
| 8,204,374 B2 | 6/2012 | Barnard |
| 8,891,922 B2 | 11/2014 | Krug et al. |
| 9,261,754 B2* | 2/2016 | Xu .................... G02B 6/12007 |
| 10,075,245 B2* | 9/2018 | Caplan ................ H04B 10/677 |
| 2003/0058535 A1 | 3/2003 | Matsuura et al. |
| 2003/0175030 A1 | 9/2003 | Chen et al. |
| 2004/0114929 A1* | 6/2004 | Madsen ............. H04J 14/0298 398/79 |
| 2004/0247227 A1* | 12/2004 | Eder .................. G02B 6/12007 385/11 |
| 2006/0023987 A1 | 2/2006 | Yao |
| 2006/0133807 A1 | 6/2006 | Jenkins et al. |
| 2006/0239633 A1 | 10/2006 | Montgomery et al. |
| 2008/0123188 A1* | 5/2008 | Klein .................. G02B 6/2713 359/484.09 |
| 2008/0166095 A1 | 7/2008 | Popovic et al. |
| 2008/0193133 A1* | 8/2008 | Krug .................... G02F 1/3132 398/83 |
| 2008/0253767 A1* | 10/2008 | Galli .................. H04J 14/0206 398/45 |
| 2012/0045167 A1 | 2/2012 | Julien et al. |
| 2012/0177362 A1 | 7/2012 | Zhang et al. |
| 2013/0028604 A1 | 1/2013 | Gao |
| 2014/0056584 A1 | 2/2014 | Testa et al. |
| 2014/0112669 A1* | 4/2014 | Mizrahi .................. H04J 14/02 398/139 |
| 2015/0188659 A1* | 7/2015 | Lipson .................... H04J 14/02 398/44 |
| 2015/0381301 A1* | 12/2015 | Jeong ...................... H04J 14/02 398/79 |
| 2016/0301477 A1 | 10/2016 | Orcutt |
| 2017/0070313 A1 | 3/2017 | Kato et al. |
| 2017/0199330 A1* | 7/2017 | Doany .................. G02B 6/1221 |
| 2018/0267246 A1* | 9/2018 | Zhang ................ G02B 6/29338 |
| 2018/0335652 A1* | 11/2018 | Wen .................... G02B 6/29335 |
| 2019/0296850 A1* | 9/2019 | Ji .............................. G02B 6/293 |

FOREIGN PATENT DOCUMENTS

| | | | |
|---|---|---|---|
| CN | 1893334 A | 1/2007 | |
| CN | 101819299 A | 9/2010 | |
| CN | 102833031 A | 12/2012 | |
| CN | 104317005 A | 1/2015 | |
| CN | 105204112 A | 12/2015 | |
| EP | 1176438 A1 * | 1/2002 | ........... G02F 1/3137 |
| EP | 1717612 A1 | 11/2006 | |
| WO | 2007014218 A2 | 2/2007 | |

OTHER PUBLICATIONS

Office Action dated Jun. 4, 2019 from corresponding application No. CN 201710285001.9.
Notice of Allowance dated Dec. 12, 2019 from corresponding application No. CN 201710285001.9.
Extended European search report dated Mar. 6, 2020 from corresponding application No. EP 18790471.9.

\* cited by examiner

RECONFIGURABLE OPTICAL ADD/DROP MULTIPLEXER

CROSS-REFERENCE TO RELATED APPLICATIONS

This application is a continuation of International Application No. PCT/CN2018/082558, filed on Apr. 10, 2018, which claims priority to Chinese Patent Application No. 201710285001.9, filed on Apr. 26, 2017. The disclosures of the aforementioned applications are hereby incorporated by reference in their entireties.

TECHNICAL FIELD

Embodiments of this application relate to the field of communications technologies, and in particular, to a reconfigurable optical add/drop multiplexer.

BACKGROUND

A reconfigurable optical add/drop multiplexer (ROADM) is a key node in a wavelength division multiplexing (WDM) transmission system and an optical transport network. The ROADM usually supports wavelength reconfiguration in at least two directions; can drop, to a present node, a signal with a specific wavelength among multi-wavelength signals coming from any directions; can also add a signal with any wavelength from the present node to another node; and can flexibly configure, locally or remotely, a wavelength of a signal added from or dropped to the present node, so that a network to which the ROADM belongs has a dynamic reconfiguration capability.

Figure 1:
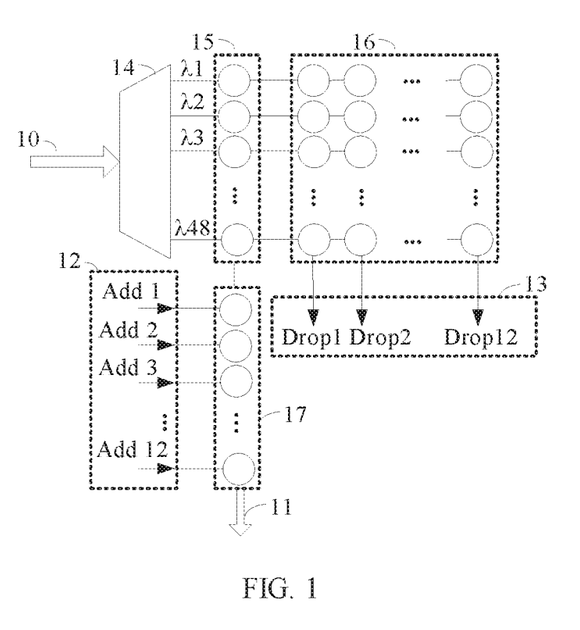
FIG. 1 is a schematic structural diagram of an existing one-dimensional ROADM.

In the prior art, there is a ROADM based on a microring add/drop filter. As shown in FIG. 1, a one-dimensional (in the embodiments of this application, a dimension is an optical signal transmission direction, and a value of the dimension is the same as a quantity of optical signal transmission directions) ROADM includes an input port 10, an output port 11, twelve add ports (represented by Add 1, Add 2, . . . , and Add 12) 12, twelve drop ports (represented by Drop 1, Drop 2, . . . , and Drop 12) 13, a 48-channel demultiplexer (DMUX) 14 connected to the input port 10, a 48×1 microring array 15, a 48×12 microring array 16 connected to the microring array 15, and a 12×1 microring array 17 connected to both the output port 11 and the twelve add ports 12. A microring array includes a plurality of microring add/drop filters. Each circle in FIG. 1 represents one microring add/drop filter. 48 WDM signals with different wavelengths are represented by λ1 to λ48, are input from the input port 10, and are divided into 48 wavelength channels after passing the DMUX 14. Straight-through signals are combined by the 48×1 microring array 15, are input to the 12×1 microring array 17, and are finally output from the output port 11. Non-straight-through signals are input to the 48×12 microring array 16, and are selectively output from a drop port. A signal that is input to each add port is combined with a straight-through signal by the 12×1 microring array 17, and is output from the output port 11.

The ROADM in the foregoing structure may be extended to a multidimensional ROADM. However, a quantity of adjustable microring add/drop filters required by a multidimensional ROADM sharply increases as a value of a dimension, a quantity of wavelengths, and a quantity of add/drop ports increase. As a result, complexity of an optical path increases, and an insertion loss and crosstalk performance of a component are sharply degraded. In addition, a polarization state of an optical signal that is input to a ROADM is random, and the ROADM in the foregoing structure has relatively high sensitivity to polarization of an input optical signal.

SUMMARY

This application provides a reconfigurable optical add/drop multiplexer ROADM, to resolve a problem that an existing ROADM has relatively high sensitivity to polarization of an input optical signal, and also resolve a problem that as a value of a dimension increases, complexity of an optical path increases, and an insertion loss and crosstalk performance of a component are sharply degraded.

To achieve the foregoing objective, the following technical solutions are used in this application.

According to a first aspect, a reconfigurable optical add/drop multiplexer ROADM is provided. The ROADM includes N (N≥1) input ports, N output ports, M (M≥1) add ports, and M drop ports. Each of the N input ports and each of the M add ports are respectively connected to one first polarizer, and each of the N output ports and each of the M drop ports are respectively connected to one second polarizer. A first end of the first polarizer is connected to a second end of the first polarizer, to form a loop including the first polarizer. A first end of the second polarizer is connected to a second end of the second polarizer, to form a loop including the second polarizer. There is an annular waveguide array between a loop $L_{Ii}$ and a loop $L_{Oj}$, where the annular waveguide array includes L first annular waveguide groups, and L≥1. A first polarizer included in the loop $L_{Ii}$ is connected to an $i^{th}$ (N≥i≥1) input port $I_i$ in the N input ports. A second polarizer included in the loop $L_{Oj}$ is connected to a $j^{th}$ (N≥j≥1) output port $O_j$ in the N output ports. There is a second annular waveguide group between the loop $L_{Ii}$ and a loop $L_{Dk}$. A second polarizer included in the loop $L_{Dk}$ is connected to a $k^{th}$ (M≥k≥1) drop port $D_k$ in the M drop ports. Specifically, the input port $I_i$ is configured to receive a first optical signal set; the first polarizer connected to the input port $I_i$ is configured to: perform polarization beam splitting on optical signals included in the first optical signal set to obtain a second optical signal set and a third optical signal set, and output the second optical signal set and the third optical signal set; the second annular waveguide group is configured to: receive a first optical signal in the second optical signal set and a second optical signal in the third optical signal set, and transmit the first optical signal and the second optical signal to the drop port $D_k$, where both a wavelength of the first optical signal and a wavelength of the second optical signal are the same as a resonant wavelength of the second annular waveguide group; the second polarizer connected to the drop port $D_k$ is configured to: perform polarization beam combination on the first optical signal and the second optical signal, and output an optical signal obtained after the polarization beam combination; the annular waveguide array is configured to: receive a first optical signal subset in the second optical signal set and a second optical signal subset in the third optical signal set, and transmit the first optical signal subset and the second optical signal subset to the output port $O_j$, where wavelengths of optical signals included in the first optical signal subset are in a one-to-one correspondence with wavelengths of optical signals included in the second optical signal subset; and the second polarizer connected to the output port $O_j$ is configured to: perform polarization beam combination on the first optical signal subset and the second optical signal subset, and output an optical signal obtained after the polarization beam combination.

The annular waveguide array in the ROADM provided in the embodiments of this application is located between the loop $L_{Ii}$ and the loop $L_{Oj}$. Therefore, the loop $L_{Ii}$, the annular waveguide array, and the loop $L_{Oj}$ may form a microring add/drop filter array. There is the second annular waveguide group between the loop $L_{Ii}$ and the loop $L_{Dk}$. Therefore, the loop $L_{Ii}$, the second annular waveguide group, and the loop $L_{Dk}$ may form a microring add/drop filter. Correspondingly, the ROADM provided in the embodiments of this application is a component that uses a microring add/drop filter as a basic composition unit. Based on a feature of the microring add/drop filter, the ROADM may switch an optical signal with a specific wavelength between different ports, to add or drop the optical signal with the specific wavelength. Compared with an existing ROADM based on a microring add/drop filter, the ROADM provided in the embodiments of this application requires no DMUX, and a quantity of microring add/drop filters is irrelevant to a quantity of wavelengths included in input signals. Therefore, the ROADM provided in the embodiments of this application is more highly integrated. In addition, based on the feature of the microring add/drop filter, in the ROADM provided in the embodiments of this application, one polarizer (the first polarizer or the second polarizer) is further connected to each port, to perform polarization beam splitting or polarization beam combination on an optical signal, so as to resolve the problem that the sensitivity to polarization of an input optical signal is relatively high.

Optionally, in a possible implementation of this application, there is a third annular waveguide group between the loop $L_{Oj}$ and a loop $L_{A}k$. A first polarizer included in the loop $L_{A}k$ is connected to a $k^{th}$ add port $A_k$ in the M add ports. Specifically, the add port $A_k$ is configured to receive a third optical signal; the first polarizer connected to the add port $A_k$ is configured to: perform polarization beam splitting on the third optical signal to obtain a fourth optical signal and a fifth optical signal, and output the fourth optical signal and the fifth optical signal; the third annular waveguide group is configured to: receive the fourth optical signal and the fifth optical signal, and transmit the fourth optical signal and the fifth optical signal to the output port $O_j$, where a wavelength of the fourth optical signal is the same as a wavelength of the fifth optical signal and is different from a wavelength of an optical signal included in the first optical signal subset; and the second polarizer connected to the output port $O_j$ is specifically configured to: perform polarization beam combination on the first optical signal subset, the second optical signal subset, the fourth optical signal, and the fifth optical signal, and output an optical signal obtained after the polarization beam combination.

The ROADM provided in the embodiments of this application is in a symmetric structure. A flow direction of the third optical signal that is input from the add port $A_k$ is similar to a flow direction of the first optical signal set that is input from the input port $I_i$.

Optionally, in another possible implementation of this application, each of the L first annular waveguide groups is coupled with the loop $L_{Ii}$ and the loop $L_{Oj}$, the first annular waveguide group includes X annular waveguides, and X≥1. When X>1, any two adjacent annular waveguides in the X annular waveguides are coupled with each other. The second annular waveguide group includes Y annular waveguides, and Y≥1. When Y>1, any two adjacent annular waveguides in the Y annular waveguides are coupled with each other.

The third annular waveguide group includes Z annular waveguides, and Z≥1. When Z>1, any two adjacent annular waveguides in the Z annular waveguides are coupled with each other.

Any annular waveguide group in the embodiments of this application includes at least one annular waveguide. A composition structure of the at least one annular waveguide is not specifically limited in the embodiments of this application.

Optionally, in another possible implementation of this application, the first end of the first polarizer is connected to the second end of the first polarizer by using a waveguide, and the first end of the second polarizer is connected to the second end of the second polarizer by using a waveguide.

Optionally, in another possible implementation of this application, the first polarizer is a polarization beam splitting rotator, and the second polarizer is a polarization rotation beam combiner.

In addition, the first polarizer in the embodiments of this application may alternatively be any other device that has a polarization beam splitting function. Likewise, the second polarizer in the embodiments of this application may alternatively be any other device that has a polarization beam combination function. For example, both the first polarizer and the second polarizer are two-dimensional grating couplers.

Optionally, in another possible implementation of this application, lengths of optical paths of any two optical signals that are respectively in the first optical signal subset and the second optical signal subset and that have a same wavelength are equal. Lengths of optical paths of the first optical signal and the second optical signal are equal. Lengths of optical paths of the fourth optical signal and the fifth optical signal are equal.

In this application, a name of the reconfigurable optical add/drop multiplexer does not constitute a limitation on devices or function modules. In actual implementation, the devices or the function modules may appear with other names. Provided that functions of the devices or the function modules are similar to those in this application, the devices or the function modules fall within the scope of the claims of this application and equivalent technologies.

These aspects or other aspects of this application are clearer and easier to understand in the following descriptions.

DESCRIPTION OF EMBODIMENTS

In the specification, claims, and accompanying drawings of this application, the terms "first", "second", "third", "fourth", and so on are intended to distinguish between different objects but do not limit a particular order.

A term such as "exemplary" or "for example" in the embodiments of this application means "used as an example, an illustration, or a description". Any embodiment or design solution described as "exemplary" or "for example" in the embodiments of this application should not be explained as being more preferred or having more advantages than another embodiment or design solution. Exactly, use of the term such as "exemplary" or "for example" is intended to present a related concept in a specific manner.

For ease of understanding the embodiments of this application, related elements included in the embodiments of this application are first described herein.

A microring add/drop filter is a microring structure used for optical filtering. A standard structure of the microring add/drop filter includes two parallel straight waveguides and an annular waveguide coupled with both the two straight waveguides. The two straight waveguides are also referred to as bus waveguides or port waveguides, and may be coupled with the annular waveguide by using a directional coupler (using an evanescent wave principle) or a multi-mode interference (MMI) coupler.

Figure 2:
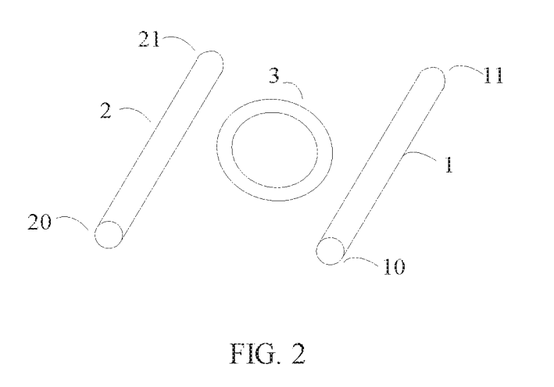
FIG. 2 is a schematic structural diagram of an existing microring add/drop filter in a standard structure.

For example, FIG. 2 shows a microring add/drop filter in a standard structure. As shown in FIG. 2, the microring add/drop filter includes a straight waveguide 1, a straight waveguide 2, and an annular waveguide 3 coupled with both the straight waveguide 1 and the straight waveguide 2. Two ends of the straight waveguide 1 are respectively an input port 10 and an output port 11 of the microring add/drop filter. Two ends of the straight waveguide 2 are respectively an add port 21 and a drop port 20 of the microring add/drop filter. For the straight waveguide 1, the input port 10 is an input end of the straight waveguide 1, and the output port 11 is an output end of the straight waveguide 1. For the straight waveguide 2, the add port 21 is an input end of the straight waveguide 2, and the drop port 21 is an output end of the straight waveguide 2.

A resonance condition of the microring add/drop filter is $2\pi R N_{eff} = m\lambda$, where m is an integer, R is a radius of the annular waveguide, $N_{eff}$ is an effective refractive index of the annular waveguide, and $\lambda$ is a wavelength of an input signal. Optical signals satisfying the resonance condition are subject to constructive interference in the microring add/drop filter. To be specific, an optical signal satisfying the resonance condition is input from an input end of a straight waveguide, and is output from an output end of another straight waveguide. Optical signals not satisfying the resonance condition are subject to destructive interference in the microring add/drop filter. To be specific, an optical signal not satisfying the resonance condition is input from an input end of a straight waveguide, and is output from an output end of the same straight waveguide.

Figure 3:
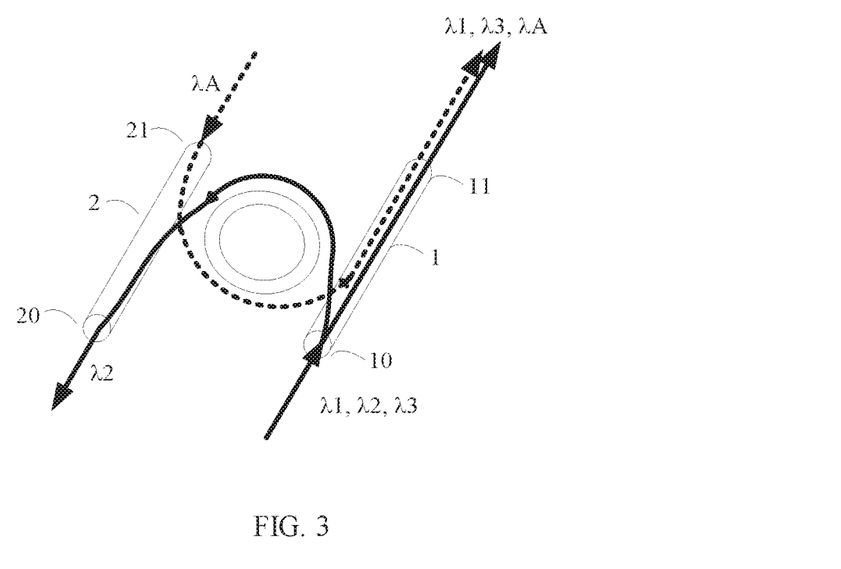
FIG. 3 is a schematic working diagram of an existing microring add/drop filter in a standard structure.

With reference to FIG. 2, it is assumed that an optical signal with a wavelength of $\lambda 1$, an optical signal with a wavelength of $\lambda 2$, and an optical signal with a wavelength of $\lambda 3$ are input from the input port 10, and an optical signal with a wavelength of $\lambda A$ is input from the add port 21. As shown in FIG. 3, if $\lambda 2$ and $\lambda A$ satisfy the resonance condition of the microring add/drop filter, the optical signal with the wavelength of $\lambda 2$ is output from the drop port 20, and the optical signal with the wavelength of $\lambda A$ is output from the output port 11. Because the optical signal with the wavelength of $\lambda 1$ and the optical signal with the wavelength of $\lambda 3$ do not satisfy the resonance condition of the microring add/drop filter, the optical signal with the wavelength of $\lambda 1$ and the optical signal with the wavelength of $\lambda 3$ are directly output from the straight waveguide 1, to be specific, are output from the output port 11.

Certainly, the straight waveguides included in the microring add/drop filter may alternatively be arranged in a cross manner, in addition to the foregoing parallel arrangement. The microring add/drop filter may include one or more annular waveguides. When the two straight waveguides are arranged in the cross manner, the annular waveguide may be located in any direction of a crosspoint, provided that the annular waveguide is coupled with both the two straight waveguides. When the microring add/drop filter includes a plurality of annular waveguides, any two adjacent annular waveguides in the plurality of annular waveguides are coupled with each other.

Figure 4A:
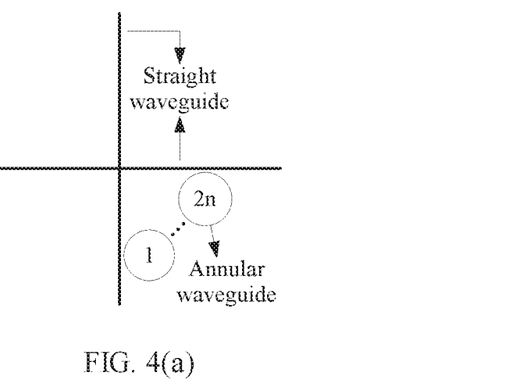
FIG. 4(a) is a schematic structural diagram 1 of an existing microring add/drop filter that includes a plurality of annular waveguides.
Figure 4B:
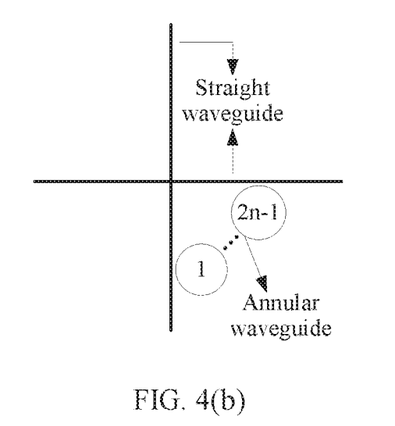
FIG. 4(b) is a schematic structural diagram 2 of an existing microring add/drop filter that includes a plurality of annular waveguides.

For example, as shown in FIG. 4(a), the straight waveguides included in the microring add/drop filter are arranged in the cross manner, there are 2n (n≥1) annular waveguides, any two adjacent annular waveguides in the 2n annular waveguides are coupled with each other, and the 2n annular waveguides are located in the lower right of the crosspoint of the straight waveguides. As shown in FIG. 4(b), the straight waveguides included in the microring add/drop filter are arranged in the cross manner, there are 2n−1 (n≥1) annular waveguides, any two adjacent annular waveguides in the 2n−1 annular waveguides are coupled with each other, and the 2n−1 annular waveguides are located in the lower right of the crosspoint of the straight waveguides.

A working principle of the microring add/drop filter shown in FIG. 4(a) and FIG. 4(b) is the same as a working principle of the microring add/drop filter shown in FIG. 2. Details are not described herein again.

An existing ROADM based on a microring add/drop filter may be extended to a multidimensional ROADM. However, a quantity of adjustable microring add/drop filters required by a multidimensional ROADM sharply increases as a value of a dimension, a quantity of wavelengths, and a quantity of add/drop ports increase. As a result, complexity of an optical path increases, and an insertion loss and crosstalk performance of a component are sharply degraded. In addition, a polarization state of an optical signal that is input to a ROADM is random, and the existing ROADM has relatively high sensitivity to polarization of an input optical signal.

For the foregoing problem, a ROADM provided in the embodiments of this application includes N (N≥1) input ports, N output ports, M (M≥1) add ports, and M drop ports. With reference to the foregoing descriptions, it can be learned that a value of a dimension of the ROADM is the same as a quantity of optical signal transmission directions. One input port and one output port represent one optical signal transmission direction. Therefore, in the embodiments of this application, a quantity of input ports or a quantity of output ports is used to represent the dimension of the ROADM.

For ease of understanding, that N=2 is now used as an example for description, namely, a two-dimensional ROADM is used for description.

Figure 5:
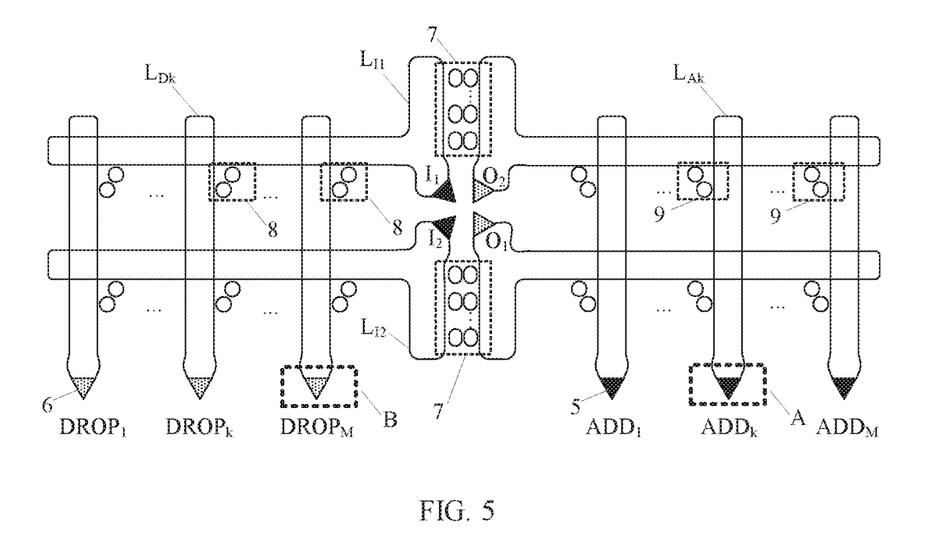
FIG. 5 is a schematic structural diagram of a two-dimensional ROADM according to an embodiment of this application.

As shown in FIG. 5, the two-dimensional ROADM includes two input ports ($I_1$ and $I_2$), two output ports ($O_1$ and $O_2$), M add ports ($ADD_1$, $ADD_2$, . . . , and $ADD_M$), and M drop ports ($DROP_1$, $DROP_2$, . . . , and $DROP_M$).

Each input port and each add port are respectively connected to one first polarizer 5, and the first polarizer 5 is configured to perform polarization beam splitting processing on an optical signal received by the first polarizer 5.

Each output port and each drop port are respectively connected to one second polarizer 6, and the second polarizer 6 is configured to perform polarization beam combination processing on an optical signal received by the second polarizer 6.

Under an effect of the first polarizer 5 and the second polarizer 6, the two-dimensional ROADM is not sensitive to polarization of an input optical signal.

Optionally, the first polarizer 5 is a polarization beam splitting rotator, and the second polarizer 6 is a polarization rotation beam combiner. Certainly, the first polarizer 5 may alternatively be any other device that has a polarization beam splitting function, and the second polarizer 6 may alternatively be any other device that has a polarization beam combination function.

For example, both the first polarizer 5 and the second polarizer 6 are two-dimensional gating couplers.

A first end of the first polarizer 5 is connected to a second end of the first polarizer 5, to form a loop including the first polarizer 5. For example, in FIG. 5, a first end and a second end of a first polarizer 5 connected to the input port $I_1$ are connected to each other, to form a loop $L_{I1}$ including the first polarizer 5; a first end and a second end of a first polarizer 5 connected to the input port $I_2$ are connected to each other, to form a loop $L_{I2}$ including the first polarizer 5; and a first end and a second end of a first polarizer 5 connected to a $k^{th}$ (M≥k≥1) add port $A_k$ are connected to each other, to form a loop $L_{Ak}$ including the first polarizer 5.

Optionally, in this embodiment of this application, the first end of the first polarizer 5 is connected to the second end of the first polarizer 5 by using a waveguide.

Figure 6:
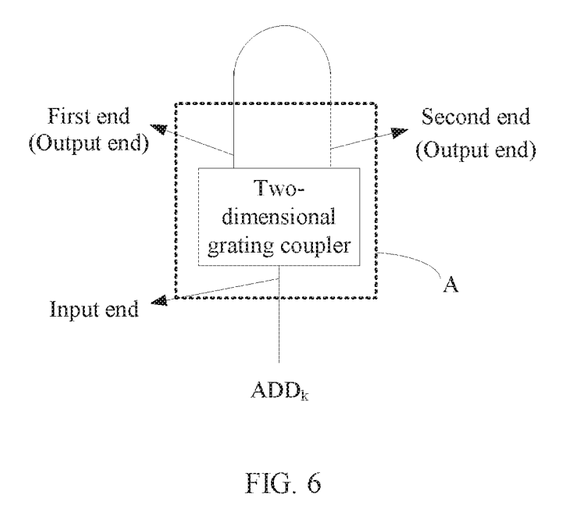
FIG. 6 is a schematic structural diagram of a first polarizer according to an embodiment of this application.

If the first polarizer 5 is a two-dimensional grating coupler, the first end of the first polarizer 5 is one output end of the two-dimensional grating coupler, and the second end of the first polarizer 5 is the other output end of the two-dimensional grating coupler. For example, with reference to FIG. 5, a first polarizer 5 represented by A in FIG. 5 is a two-dimensional grating coupler, and FIG. 6 shows a structure of the first polarizer 5.

A first end of the second polarizer 6 is connected to a second end of the second polarizer 6, to form a loop including the second polarizer 6. For example, in FIG. 5, a first end and a second end of a second polarizer 6 connected to the output port $O_1$ are connected to each other, to form a loop $L_{O1}$ including the second polarizer 6; a first end and a second end of a second polarizer 6 connected to the output port $O_2$ are connected to each other, to form a loop $L_{O2}$ including the second polarizer 6; and a first end and a second end of a second polarizer 6 connected to a $k^{th}$ drop port $DROP_k$ are connected to each other, to form a loop $L_{Dk}$ including the second polarizer 6.

Optionally, in this embodiment of this application, the first end of the second polarizer 6 is connected to the second end of the second polarizer 6 by using a waveguide.

Figure 7:
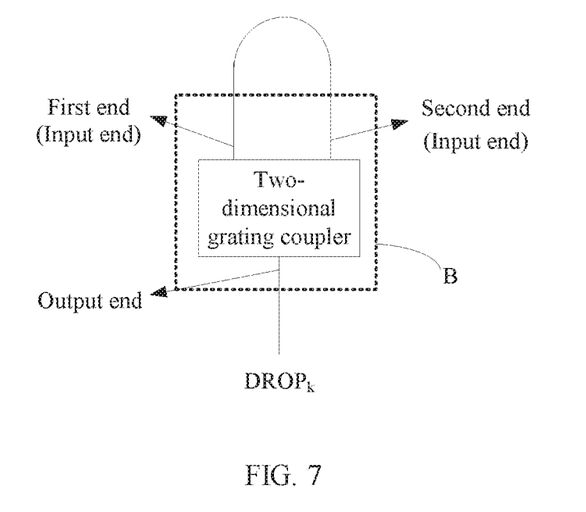
FIG. 7 is a schematic structural diagram of a second polarizer according to an embodiment of this application.

If the second polarizer 6 is a two-dimensional grating coupler, the first end of the second polarizer 6 is one input end of the two-dimensional grating coupler, and the second end of the second polarizer 6 is the other input end of the two-dimensional grating coupler. For example, with reference to FIG. 5, a second polarizer 6 represented by B in FIG. 5 is a two-dimensional grating coupler, and FIG. 7 shows a structure of the second polarizer 6.

Between the loop $L_{I1}$ and the loop $L_{O2}$, there is an annular waveguide array 7 including L (L≥1) first annular waveguide groups. Likewise, there is also an annular waveguide array 7 between the loop $L_{I2}$ and the loop $L_{O1}$. The L first annular waveguide groups in the annular waveguide array 7 are independent of each other, and each first annular waveguide group includes X (X≥1) annular waveguides. When X>1, any two adjacent annular waveguides in the X annular waveguides are coupled with each other. For the X annular waveguides herein, refer to the annular waveguide in the mirroring add/drop filter shown in FIG. 4. Each first annular waveguide group in the annular waveguide array 7 shown in FIG. 5 includes two annular waveguides, namely, X=2.

There is a second annular waveguide group 8 between a loop $L_{Ii}$ and the loop $L_{Dk}$. The second annular waveguide group 8 includes Y annular waveguides. When Y>1, any two adjacent annular waveguides in the Y annular waveguides are coupled with each other. The second annular waveguide group 8 shown in FIG. 5 includes two annular waveguides, namely, Y=2. As shown in FIG. 5, there is a second annular waveguide group 8 between the loop $L_{I1}$ and the loop $L_{Dk}$, and there is a second annular waveguide group 8 between the loop $L_{I2}$ and the loop $L^{Dk}$.

There is a third annular waveguide group 9 between a loop $L_{Oj}$ and the loop $L_{Ak}$. The third annular waveguide group 9 includes Z annular waveguides. When Z>1, any two adjacent annular waveguides in the Z annular waveguides are coupled with each other. The third annular waveguide group 9 shown in FIG. 5 includes two annular waveguides, namely, Z=2. As shown in FIG. 5, there is a third annular waveguide group 9 between the loop $L_{O1}$ and the loop $L_{Ak}$, and there is a third annular waveguide group 9 between the loop $L_{O2}$ and the loop $L_{Ak}$.

With reference to the foregoing descriptions of the microring add/drop filter, it can be learned that, in FIG. 5, if a first end and a second end of any first polarizer 5 are connected to each other by using a waveguide, and a first end and a second end of any second polarizer 6 are connected to each other by using a waveguide, any annular waveguide group in FIG. 5 and two waveguides adjacent to the annular waveguide group can form a mirroring add/drop filter.

For example, for the second annular waveguide group 8 between the loop $L_{I1}$ and the loop $L_{Dk}$, the second annular waveguide group 8, a waveguide in the loop $L_{I1}$, and a waveguide in the $L_{Dk}$ form a microring add/drop filter. A structure of the mirroring add/drop filter is the same as a structure of the microring add/drop filter shown in FIG. 4(a).

According to the ROADM provided in this embodiment of this application, when a first optical signal set is input from an input port $I_i$, a first polarizer 5 connected to the input port $I_i$ performs polarization beam splitting on optical signals included in the first optical signal set to obtain a second optical signal set and a third optical signal set, and outputs the second optical signal set and the third optical signal set. Herein, a polarization state of the second optical signal set is the same as a polarization state of the third optical signal set.

If a wavelength of a first optical signal in the second optical signal set is equal to a resonant wavelength of the second annular waveguide group 8 located between the loop $L_{Ii}$ and the loop $L_{Dk}$, and a wavelength of a second optical signal in the third optical signal set is also equal to the resonant wavelength of the second annular waveguide group 8 located between the loop $L_{Ii}$ and the loop $L_{Dk}$, the first optical signal and the second optical signal are transmitted to a drop port $D_k$ by using the second annular waveguide group 8. Further, a second polarizer 6 connected to the drop port $D_k$ performs polarization beam combination on the first optical signal and the second optical signal, and outputs an optical signal obtained after the polarization beam combination.

In addition, a first optical signal subset in the second optical signal set is transmitted to an output pork $O_j$ by using the annular waveguide array 7 located between the loop $L_{Ii}$ and the loop $L_{Oj}$, and a second optical signal subset in the third optical signal set is also transmitted to the output port $O_j$ by using the annular waveguide array. Herein, wavelengths of optical signals included in the first optical signal subset are in a one-to-one correspondence with wavelengths of optical signals included in the second optical signal subset. Further, a second polarizer 6 connected to the output port $O_j$ performs polarization beam combination on the first optical signal subset and the second optical signal subset, and outputs an optical signal obtained after the polarization beam combination.

Further, when a third optical signal s input from the add port $A_k$, the first polarizer 5 connected to the add port $A_k$ performs polarization beam splitting on the third optical signal to obtain a fourth optical signal and a fifth optical signal, and outputs the fourth optical signal and the fifth optical signal. The fourth optical signal and the fifth optical signal are transmitted to the output port $O_j$ by using the third annular waveguide group 9 located between the loop $L_{Ak}$ and the loop $L_{Oj}$. Herein, a wavelength of the fourth optical signal is the same as a wavelength of the fifth optical signal and is different from a wavelength of an optical signal included in the first optical signal subset. In this way, the second polarizer connected to the output port $O_j$ is specifically configured to: perform polarization beam combination on the first optical signal subset, the second optical signal subset, the fourth optical signal, and the fifth optical signal, and output an optical signal obtained after the polarization beam combination.

Lengths of optical paths of any two optical signals that are respectively in the first optical signal subset and the second optical signal subset and that have a same wavelength are equal. Lengths of optical paths of the first optical signal and the second optical signal are equal. Lengths of optical paths of the fourth optical signal and the fifth optical signal are equal.

For example, in FIG. 5, when the first optical signal set is input from the input port $I_1$, the first polarizer 5 connected to the input port $I_1$ performs polarization beam splitting on optical signals included in the first optical signal set to obtain the second optical signal set and the third optical signal set, and outputs the second optical signal set and the third optical signal set. If the first optical signal in the second optical signal set and the second optical signal in the third optical signal set are transmitted to the drop port $D_k$ by using the second annular waveguide group 8 located between the loop $L_{I1}$ and the loop $L_{Dk}$, the second polarizer 6 connected to the drop port $D_k$ performs polarization beam combination on the first optical signal and the second optical signal, and outputs the optical signal obtained after the polarization beam combination. In addition, the first optical signal subset in the second optical signal set is transmitted to the output port $O_2$ by using the annular waveguide array 7 located between the loop $L_{I1}$ and the loop $L_{O2}$, and the second optical signal subset in the third optical signal set is also transmitted to the output port $O_2$ by using the annular waveguide array 7. Further, the second polarizer 6 connected to the output port $O_2$ performs polarization beam combination on the first optical signal subset and the second optical signal subset, and outputs an optical signal obtained after the polarization beam combination.

It should be noted that, in FIG. 5, if resonance occurs when the first optical signal and the second optical signal pass the second annular waveguide group 8 located between the loop $L_{I1}$ and the loop $L_{Dk}$, no resonance occurs when the first optical signal and the second optical signal pass the second annular waveguide group 8 located between the loop $L_{I2}$ and the loop $L_{Dk}$.

Figure 8:
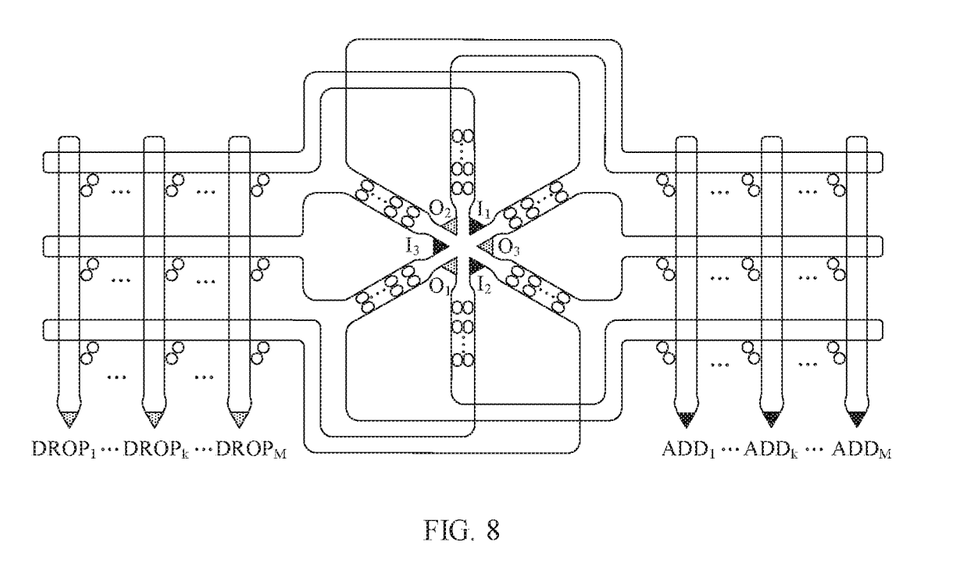
FIG. 8 is a schematic structural diagram of a three-dimensional ROADM according to an embodiment of this application.
Figure 9:
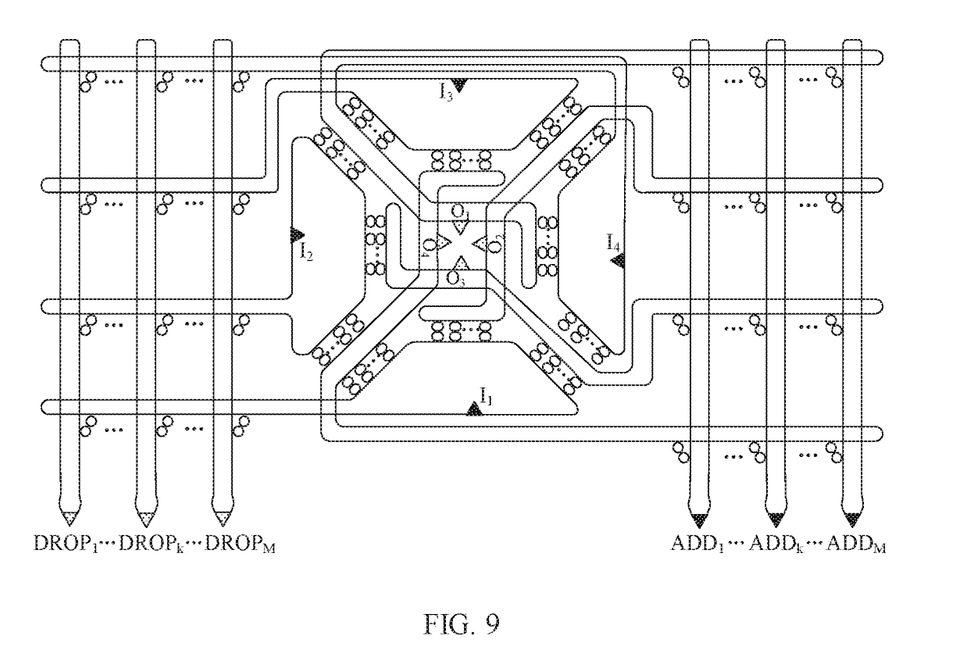
FIG. 9 is a schematic structural diagram of a four-dimensional ROADM according to an embodiment of this application.

The dimension of the ROADM provided in this embodiment of this application may alternatively have another value, for example, a three-dimensional ROADM or a four-dimensional ROADM. For example, FIG. 8 shows a three-dimensional ROADM in which each annular waveguide group includes two annular waveguides, and FIG. 9 shows a four-dimensional ROADM in which each annular waveguide group includes two annular waveguides. Regardless of a specific dimension of a ROADM, a structure of the ROADM is similar to a structure of the ROADM shown in any one of FIG. 5, FIG. 8, and FIG. 9.

It should be noted that, for any one of the foregoing annular waveguide groups, if the annular waveguide group includes at least two annular waveguides, a location relationship between the at least two annular waveguides is not limited in the embodiments of this application, provided that the at least two annular waveguides are coupled with straight waveguides adjacent to the at least two annular waveguides.

To sum up, the ROADM provided in the embodiments of this application is a component that uses a microring add/drop filter as a basic composition unit. Based on a feature of the microring add/drop filter, the ROADM may switch an optical signal with a specific wavelength between different ports, to add or drop the optical signal with the specific wavelength. Compared with an existing ROADM based on a microring add/drop filter, the ROADM provided in the embodiments of this application requires no DMUX, and a quantity of microring add/drop filters is irrelevant to a quantity of wavelengths included in input signals. Therefore, the ROADM provided in the embodiments of this application is more highly integrated. In addition, based on the feature of the microring add/drop filter, in the ROADM provided in the embodiments of this application, one polarizer (the first polarizer or the second polarizer) is further connected to each port, to perform polarization beam splitting or polarization beam combination on an optical signal, so as to resolve the problem that the sensitivity to polarization of an input optical signal is relatively high.

The foregoing descriptions are merely specific implementations of this application, but are not intended to limit the protection scope of this application. Any variation or replacement disclosed in this application shall fall within the protection scope of this application. Therefore, the protection scope of this application shall be subject to the protection scope of the claims.

What is claimed is:
1. A reconfigurable optical add/drop multiplexer, comprising:
   N input ports;
   N output ports;
   M add ports; and
   M drop ports,
   wherein
   N≥1 and M≥1 each of the N input ports and each of the M add ports is respectively connected to a corresponding first polarizer, the corresponding first polarizer being one of one or more first polarizers, each of the N output ports and each of the M drop ports is respectively connected to a corresponding second polarizer, the corresponding second polarizer being one of two or more second polarizers, a first end of each first polarizer of the one or more first polarizers is connected to a second end of the same first polarizer, forming a loop comprising one of the one or more first polarizers, a first end of each second polarizer of the two or more second polarizers is connected to a second end of the same second polarizer, forming a loop comprising one of the two or more second polarizers, an annular waveguide array is between a loop $L_{Ii}$ and a loop $L_{Oj}$, the annular waveguide array comprising L first annular waveguide groups, where L≥1, the loop $L_{Ii}$ includes one of the one or more first polarizers, and the first polarizer included in the loop $L_{Ii}$ is connected to an $i^{th}$ input port $I_i$ of the N input ports, where N≥i≥1, the loop $L_{Oj}$ includes a first-second polarizer of the two or more second polarizers, and the first-second polarizer included in the loop $L_{Oj}$ is connected to a $j^{th}$ output port $O_j$ of the N output ports, where N≥j≥1, a second annular waveguide group is between the loop $L_{Ii}$ and a loop $L_{Dk}$, the loop $L_{Dk}$ includes a second-second polarizer of the two or more second polarizers, and the second-second polarizer included in the loop $L_{Dk}$ is connected to a $k^{th}$ drop port $D_k$ of the M drop ports, where M≥k≥1, the input port $I_i$ is configured to receive a first optical signal set, the corresponding first polarizer of the one or more first polarizers connected to the input port $I_i$ is configured to:
  perform a polarization beam splitting on optical signals included in the first optical signal set to obtain a second optical signal set and a third optical signal set; and
  output the second optical signal set and the third optical signal set, the second annular waveguide group is configured to:
  receive a first optical signal in the second optical signal set and a second optical signal in the third optical signal set; and
  transmit the first optical signal and the second optical signal to the drop port $D_k$, both a wavelength of the first optical signal and a wavelength of the second optical signal are the same as a resonant wavelength of the second annular waveguide group, the second-second polarizer connected to the drop port $D_k$ is configured to:
  perform a polarization beam combination on the first optical signal and the second optical signal; and
  output an optical signal obtained after the polarization beam combination, the annular waveguide array is configured to:
  receive a first optical signal subset in the second optical signal set and a second optical signal subset in the third optical signal set; and
  transmit the first optical signal subset and the second optical signal subset to the output port $O_j$, wavelengths of optical signals included in the first optical signal subset are in a one-to-one correspondence with wavelengths of optical signals included in the second optical signal subset, and the first-second polarizer connected to the output port $O_j$ is configured to:
  perform a polarization beam combination on the first optical signal subset and the second optical signal subset, and
  output an optical signal obtained after the polarization beam combination.

2. The reconfigurable optical add/drop multiplexer according to claim 1, wherein
the corresponding first polarizer is one of two or more first polarizers,
the first polarizer included in the loop $L_{Ii}$ is a first-first polarizer of the two or more first polarizers,
a third annular waveguide group is between the loop $L_{Oj}$ and a loop $L_{Ak}$,
the loop $L_{Ak}$ includes a second-first polarizer of the two or more first polarizers, and the second-first polarizer included in the loop $L_{Ak}$ is connected to a $k^{th}$ add port $A_k$ of the M add ports,
the add port $A_k$ is configured to receive a third optical signal,
the second-first polarizer connected to the add port $A_k$ is configured to:
  perform a polarization beam splitting on the third optical signal to obtain a fourth optical signal and a fifth optical signal; and
  output the fourth optical signal and the fifth optical signal, the third annular waveguide group is configured to:
  receive the fourth optical signal and the fifth optical signal; and
  transmit the fourth optical signal and the fifth optical signal to the output port $O_j$,
a wavelength of the fourth optical signal is the same as a wavelength of the fifth optical signal and is different from a wavelength of an optical signal included in the first optical signal subset, and
the first-second polarizer connected to the output port $O_j$ is configured to:
  perform a polarization beam combination on the first optical signal subset, the second optical signal subset, the fourth optical signal, and the fifth optical signal; and
  output an optical signal obtained after the polarization beam combination.

3. The reconfigurable optical add/drop multiplexer according to claim 2, wherein
each of the L first annular waveguide groups is coupled with the loop $L_{Ii}$ and the loop $L_{Oj}$,
the first annular waveguide group comprises X annular waveguides, where X≥1, and when X>1, any two adjacent annular waveguides in the X annular waveguides are coupled with each other,
the second annular waveguide group comprises Y annular waveguides, where Y≥1, and when Y>1, any two adjacent annular waveguides in the Y annular waveguides are coupled with each other, and
the third annular waveguide group comprises Z annular waveguides, where Z≥1, and when Z>1, any two adjacent annular waveguides in the Z annular waveguides are coupled with each other.

4. The reconfigurable optical add/drop multiplexer according to claim 1, wherein the first end of each first polarizer of the one or more first polarizers is connected to the second end of the same first polarizer by using a first waveguide, and the first end of each second polarizer of the two or more second polarizers is connected to the second end of the same second polarizer by using a second waveguide.

5. The reconfigurable optical add/drop multiplexer according to claim 1, wherein at least one first polarizer is a polarization beam splitting rotator, and at least one second polarizer is a polarization rotation beam combiner.

6. A method in a reconfigurable optical add/drop multiplexer (ROADM), wherein the ROADM comprises:
N input ports;
N output ports;
M add ports; and
M drop ports,
where N≥1 and M≥1,
each of the N input ports and each of the M add ports is respectively connected to a corresponding first polarizer, the corresponding first polarizer being one of one or more first polarizers,
each of the N output ports and each of the M drop ports is respectively connected to a corresponding second polarizer, the corresponding second polarizer being one of two or more second polarizers,
a first end of each first polarizer of the one or more first polarizers is connected to a second end of the same first polarizer, forming a loop comprising one of the one or more first polarizers,
a first end of each second polarizer of the two or more second polarizers is connected to a second end of the same second polarizer, forming a loop comprising one of the two or more second polarizers,
an annular waveguide array is between a loop $L_{Ii}$ and a loop $L_{Oj}$, the annular waveguide array comprising L first annular waveguide groups, where L≥1,
the loop $L_{Ii}$ includes one of the one or more first polarizers, and the first polarizer included in the loop $L_{Ii}$ is connected to an $i^{th}$ input port $I_i$ of the N input ports, where N≥i≥1,
the loop $L_{Oj}$ includes a first-second polarizer of the two or more second polarizers, and the first-second polarizer included in the loop $L_{Oj}$ is connected to a $j^{th}$ output port $O_j$ of the N output ports, where N≥j≥1,
a second annular waveguide group is between the loop $L_{Ii}$ and a loop $L_{Dk}$,
the loop $L_{Dk}$ includes a second-second polarizer of the two or more second polarizers, and the second-second polarizer included in the loop $L_{Dk}$ is connected to a $k^{th}$ drop port $D_k$ of the M drop ports, where M≥k≥1,
the method comprises:
receiving, by the input port $I_i$ a first optical signal set,
performing, by the corresponding first polarizer of the one or more first polarizers connected to the input port $I_i$, a polarization beam splitting on optical signals included in the first optical signal set to obtain a second optical signal set and a third optical signal set; and outputting the second optical signal set and the third optical signal set,
receiving, by the second annular waveguide group, a first optical signal in the second optical signal set and a second optical signal in the third optical signal set; and transmitting the first optical signal and the second optical signal to the drop port Dk, where both a wavelength of the first optical signal and a wavelength of the second optical signal are the same as a resonant wavelength of the second annular waveguide group,
performing, by the second-second polarizer connected to the drop port $D_k$, a polarization beam combination on the first optical signal and the second optical signal; and outputting an optical signal obtained after the polarization beam combination,
receiving, by the annular waveguide array, a first optical signal subset in the second optical signal set and a second optical signal subset in the third optical signal set; and transmitting the first optical signal subset and the second optical signal subset to the output port $O_j$, where wavelengths of optical signals included in the first optical signal subset are in a one-to-one correspondence with wavelengths of optical signals included in the second optical signal subset, and
performing, by the first-second polarizer connected to the output port $O_j$, a polarization beam combination on the first optical signal subset and the second optical signal subset; and outputting an optical signal obtained after the polarization beam combination.

7. The method according to claim 6, wherein
the corresponding first polarizer is one of two or more first polarizers,
the first polarizer included in the loop $L_{Ii}$ is a first-first polarizer of the two or more first polarizers,
a third annular waveguide group is between the loop $L_{Oj}$ and a loop $L_{Ak}$,
the loop $L_{Ak}$ includes a second-first polarizer of the two or more first polarizers, and the second-first polarizer included in the loop $L_{Ak}$ is connected to a $k^{th}$ add port $A_k$ of the M add ports,
the method further comprises:
receiving, by the add port $A_k$, a third optical signal,
performing, by the second-first polarizer connected to the add port $A_k$, a polarization beam splitting on the third optical signal to obtain a fourth optical signal and a fifth optical signal; and outputting the fourth optical signal and the fifth optical signal,
receiving, by the third annular waveguide group, the fourth optical signal and the fifth optical signal; and transmitting the fourth optical signal and the fifth optical signal to the output port $O_j$, where a wavelength of the fourth optical signal is the same as a wavelength of the fifth optical signal and is different from a wavelength of an optical signal included in the first optical signal subset, and
performing, by the first-second polarizer connected to the output port $O_j$, a polarization beam combination on the first optical signal subset, the second optical signal subset, the fourth optical signal, and the fifth optical signal; and outputting an optical signal obtained after the polarization beam combination.

8. The method according to claim 7, wherein
each of the L first annular waveguide groups is coupled with the loop $L_{Ii}$ and the loop $L_{Oj}$,
the first annular waveguide group comprises X annular waveguides, where X≥1, and when X>1, any two adjacent annular waveguides in the X annular waveguides are coupled with each other,
the second annular waveguide group comprises Y annular waveguides, where Y≥1, and when Y>1, any two adjacent annular waveguides in the Y annular waveguides are coupled with each other, and the third annular waveguide group comprises Z annular waveguides, where Z≥1, and when Z>1, any two adjacent annular waveguides in the Z annular waveguides are coupled with each other.

9. The method according to claim 6, wherein
the first end of each first polarizer of the one or more first polarizers is connected to the second end of the same first polarizer by using a first waveguide, and
the first end of each second polarizer of the two or more second polarizers is connected to the second end of the same second polarizer by using a second waveguide.

10. The method according to claim 6, wherein at least one first polarizer is a polarization beam splitting rotator, and at least one second polarizer is a polarization rotation beam combiner.

* * * * *